Patented Apr. 22, 1930

1,755,683

UNITED STATES PATENT OFFICE

KARL BROMIG, OF FRANKFORT-ON-THE-MAIN, GERMANY, ASSIGNOR TO DEUTSCHE GOLD & SILBER SCHEIDEANSTALT VORMALS ROESSLER, OF FRANKFORT-ON-THE-MAIN, GERMANY, A CORPORATION

PRODUCTION OF GLUTAMINIC ACID

No Drawing. Application filed March 8, 1927, Serial No. 173,796, and in Germany March 22, 1926.

This invention relates to the production of glutaminic acid from such materials as sugar residues, molasses schlempe and residues from alcoholic distillation.

Heretofore this has been complicated by the presence in the schlempe of the many interfering organic and inorganic materials.

I have found that such a separation can be obtained and a high grade product made, working according to the conditions of the following example:

100 grams of molasses schlempe having a specific gravity between 1.38 and 1.40 were treated with 80–100 cc. concentrated hydrochloric acid and heated for four to five hours in a vessel provided with a reflux condenser. Pressure may be applied whereby the time of heating is shortened considerably. The liquid is filtered while hot to remove the dark colored solids which separate. After cooling, the solids which separate out are also filtered off. The filtrate is now evaporated to about ⅔ its volume either at normal or reduced pressure, cooled advantageously by means of a cooling mixture, and while cold is saturated with hydrochloric acid gas. The cold solution is allowed to stand for 24 hours during which the glutaminic acid separates in the form of the hydrochloride which may be filtered off.

The glutaminic hydrochloride may be purified by dissolving in 10% hydrochloric acid, decolorizing by filtering through active charcoal and precipitating the pure glutaminic hydrochloride from the filtered solution with hydrochloric acid gas.

The material obtained as above has a melting point of 192–193° C. This process avoids completely the usual costly extraction with alcohol. If it is desired to obtain the calcium salt of glutaminic acid as the final product, the raw hydrochloride is dissolved in water. To the solution is then added an excess of calcium hydroxide and the mixture agitated for some time at a temperature of about 60 to 70° C. The solution is subsequently filtered in order to remove any excess of lime hydroxide which has not reacted. The dibasic calcium salt of the glutaminic acid containing one molecule of water deposits on cooling.

What I claim is:

1. Process for preparation of glutaminic acid from sugar residues comprising treating the starting material with hot concentrated hydrochloric acid, separating the hot solution from any deposited solids, cooling and again removing deposited solids, concentrating the solution, cooling to low temperature and saturating with hydrochloric acid gas whereby glutaminic acid hydrochloride separates out on standing.

2. Process according to claim 1 consisting in the further purification of the product obtained by dissolving the glutaminic acid hydrochloride in dilute hydrochloric acid and reprecipitating it therefrom by the addition of hydrochloric acid gas.

3. Process according to claim 1 consisting in purification of the product by dissolving the crude acid in dilute hydrochloric acid filtering thru charcoal and reprecipitating pure glutaminic hydrochloride by saturating the filtered solution with hydrochloric acid gas.

Signed at Frankfort-on-the-Main, Germany, this 17th day of February, A. D. 1927.

KARL BROMIG.